United States Patent
Mori et al.

(10) Patent No.: US 11,912,297 B2
(45) Date of Patent: Feb. 27, 2024

(54) DRIVING ASSISTANCE DEVICE AND DRIVING ASSIST METHOD

(71) Applicant: Mitsubishi Electric Corporation, Tokyo (JP)

(72) Inventors: Yoshihiko Mori, Tokyo (JP); Takuji Morimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 101 days.

(21) Appl. No.: 17/777,662

(22) PCT Filed: Dec. 4, 2019

(86) PCT No.: PCT/JP2019/047404
§ 371 (c)(1),
(2) Date: May 18, 2022

(87) PCT Pub. No.: WO2021/111544
PCT Pub. Date: Jun. 10, 2021

(65) Prior Publication Data
US 2023/0025721 A1    Jan. 26, 2023

(51) Int. Cl.
*G08B 23/00* (2006.01)
*B60W 40/02* (2006.01)
(Continued)

(52) U.S. Cl.
CPC ............ *B60W 50/14* (2013.01); *B60W 40/02* (2013.01); *B60W 40/08* (2013.01);
(Continued)

(58) Field of Classification Search
CPC ............ B60W 50/14; B60W 60/0015; B60W 60/0011; B60W 40/02; B60W 40/08;
(Continued)

(56) References Cited

U.S. PATENT DOCUMENTS

| 11,718,314 B1* | 8/2023 | Nallani | B60W 30/0956 |
| | | | 340/903 |
| 2018/0186379 A1* | 7/2018 | Brooks | B60W 60/0051 |
| 2021/0276568 A1* | 9/2021 | Verbeke | B60R 21/01552 |

FOREIGN PATENT DOCUMENTS

JP    2005-4414 A    1/2005

OTHER PUBLICATIONS

International Search Report for PCT/JP2019/047404 dated Feb. 18, 2020.

* cited by examiner

*Primary Examiner* — Naomi J Small
(74) *Attorney, Agent, or Firm* — Sughrue Mion, PLLC; Richard C. Turner

(57) ABSTRACT

A driving assistance device includes processing circuitry configured to acquire environmental information on an environment around a mobile object, acquire action information on an action of a driver of the mobile object, obtain control information for performing automated driving control of the mobile object on a basis of the acquired environmental information and a machine learning model, determine contribution information having a high degree of contribution to the control information, calculate cognitive information indicating a cognitive region of the driver in the environment around the mobile object, specify unrecognized contribution information estimated not to be recognized by the driver, and output driving assistance information necessary for driving assistance on a basis of the unrecognized contribution information.

6 Claims, 5 Drawing Sheets

(51) Int. Cl.
  *B60W 40/08*   (2012.01)
  *B60W 50/14*   (2020.01)
  *B60W 60/00*   (2020.01)
  *G06N 3/045*   (2023.01)
  *G06V 10/82*   (2022.01)
  *G06V 20/58*   (2022.01)

(52) U.S. Cl.
  CPC .... *B60W 60/0011* (2020.02); *B60W 60/0015* (2020.02); *G06N 3/045* (2023.01); *G06V 10/82* (2022.01); *G06V 20/58* (2022.01); *B60W 2050/143* (2013.01); *B60W 2420/42* (2013.01); *B60W 2540/225* (2020.02); *B60W 2540/229* (2020.02)

(58) Field of Classification Search
  CPC ..... B60W 2540/225; B60W 2540/229; B60W 2050/143; B60W 2420/42; G06V 20/58; G06V 10/82; G06N 3/045
  USPC ........................................................ 340/576
  See application file for complete search history.

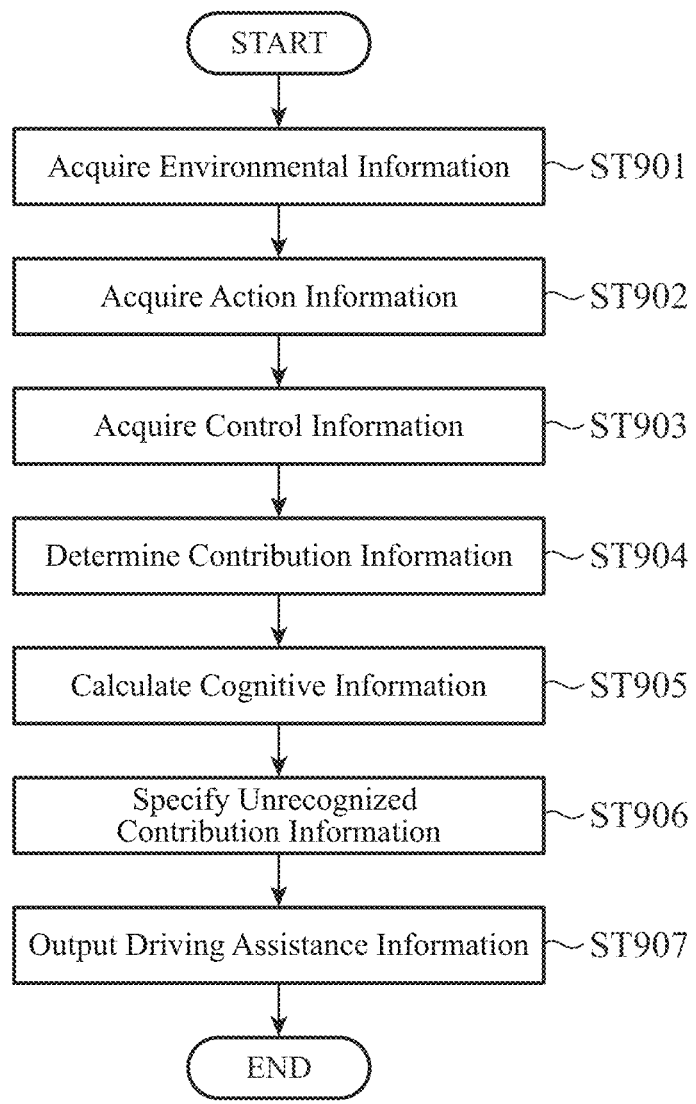

DRIVING ASSISTANCE DEVICE AND DRIVING ASSIST METHOD

CROSS REFERENCE TO RELATED APPLICATIONS

This application is a National Stage of International Application No. PCT/W2019/047404 filed Dec. 4, 2019.

TECHNICAL FIELD

The present invention relates to a driving assistance device and a driving assist method.

BACKGROUND ART

Conventionally, a driving assistance device that outputs information for assisting driving by a driver of a mobile object has been known.

For example, PTL 1 discloses a driving assistance device that determines, from a driving action of a driver, whether a cognitive state of the driver with respect to an environment is a skill based state or a knowledge-rule based state, and determines information to be provided to the driver on the basis of an environment in which a vehicle travels and the determined cognitive state.

CITATION LIST

Patent Literature

Patent Literature 1: JP 2005-4414 A

SUMMARY OF INVENTION

Technical Problem

In general, the number of environments in which the mobile object travels is countless.

On the other hand, the conventional technique as disclosed in Patent Literature 1 fails to take into account that the number of environments in which a vehicle travels is countless and only provides information on the basis of a preset rule. Therefore, in the conventional technique, there is a limit to rules that can be set to provide information, and there is a problem that information corresponding to the infinite number of environments cannot be provided.

The present invention has been made to solve the above problems, and an object thereof is to provide a driving assistance device capable of outputting information for driving assistance corresponding to the infinite number of environments.

Solution to Problem

A driving assistance device according to the present invention includes: processing circuitry configured to acquire environmental information on an environment around a mobile object; acquire action information on an action of a driver of the mobile object; obtain control information for performing automated driving control of the mobile object on a basis of the acquired environmental information and a machine learning model that uses the environmental information as an input and outputs the control information; determine contribution information having a high degree of contribution to the control information on a basis of the acquired environmental information and the obtained control information; calculate cognitive information indicating a cognitive region of the driver in the environment around the mobile object on a basis of the acquired action information and the acquired environmental information; specify unrecognized contribution information estimated not to be recognized by the driver on a basis of the determined contribution information and the calculated cognitive information; and output driving assistance information necessary for driving assistance on a basis of the unrecognized contribution information that has been specified.

Advantageous Effects of Invention

According to the present invention, it is possible to output information for driving assistance corresponding to the infinite number of environments.

BRIEF DESCRIPTION OF DRAWINGS

FIGS. 4A and 4B are diagrams for explaining an example of a cognitive information image generated by an environmental information acquiring unit on the basis of environmental information and action information in the first embodiment, in which FIG. 4A is a diagram illustrating a state in which a driver faces forward, and FIG. 4B is a diagram illustrating an image of a cognitive information image generated by a cognitive information calculating unit.

FIGS. 5A and 5B are diagrams for explaining an image of another example of the cognitive information image generated by the environmental information acquiring unit on the basis of the environmental information and the action information in the first embodiment, in which FIG. 5A is a diagram illustrating a state in which the driver looks at a left front and then looks at a right front, and FIG. 5B is a diagram illustrating an image of the cognitive information image generated by the cognitive information calculating unit.

FIGS. 6A and 6B are diagrams for explaining an image of another example of the cognitive information image generated by the environmental information acquiring unit on the basis of the environmental information and the action information in the first embodiment, in which FIG. 6A is a diagram illustrating a state in which the driver looks at a right side mirror, after looking at the left front and then looking at the right front, and FIG. 6B is a diagram illustrating an image of the cognitive information image generated by the cognitive information calculating unit.

FIG. 9 is a flowchart for explaining an operation of the driving assistance device according to the first embodiment.

DESCRIPTION OF EMBODIMENTS

Hereinafter, embodiments of the present invention will be described in detail with reference to the drawings.

First Embodiment

Figure 1:
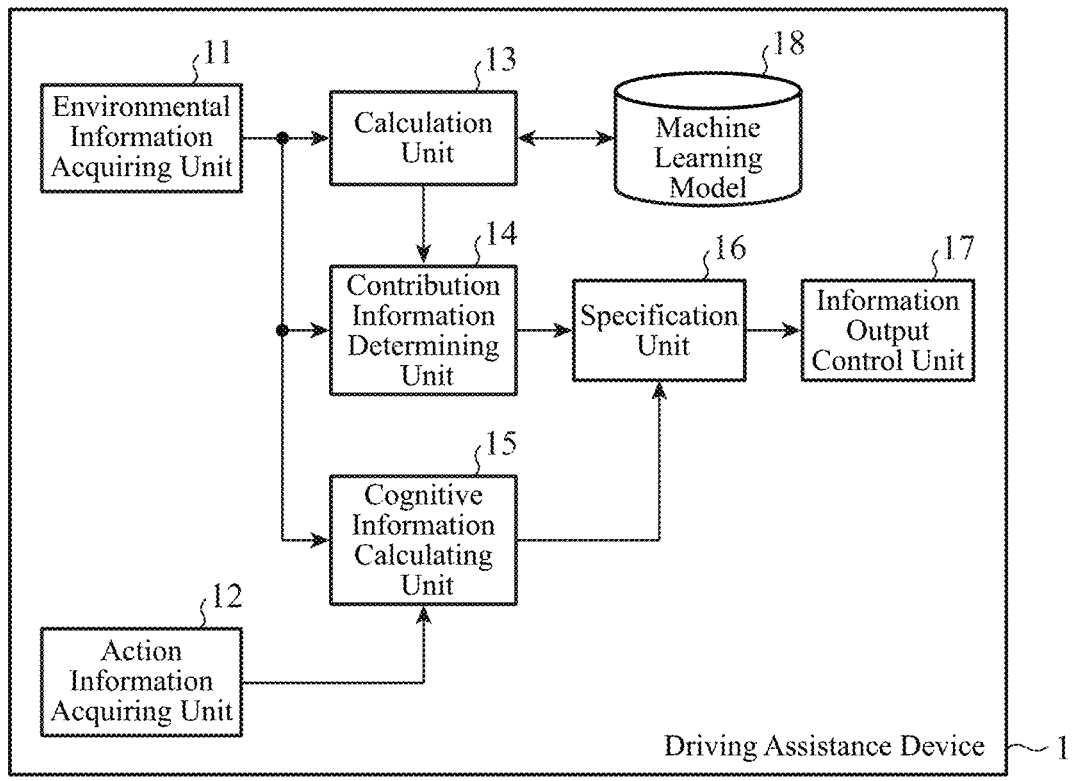
FIG. 1 is a diagram illustrating a configuration example of a driving assistance device according to a first embodiment.

FIG. 1 is a diagram illustrating a configuration example of a driving assistance device 1 according to a first embodiment.

As illustrated in FIG. 1, the driving assistance device 1 includes an environmental information acquiring unit 11, an action information acquiring unit 12, a calculation unit 13, a contribution information determining unit 14, a cognitive information calculating unit 15, a specification unit 16, an information output control unit 17, and a machine learning model 18.

In the first embodiment, the driving assistance device 1 is mounted on a vehicle and outputs information (hereinafter referred to as "driving assistance information") for assisting driving by a driver of the vehicle. It is based on the premise that the vehicle in which the driving assistance device 1 assists driving has an automated driving function. Even when the vehicle has an automated driving function, the driver can drive the vehicle by himself or herself without executing the automated driving function. The driving assistance device 1 outputs driving assistance information when a driver is driving by himself or herself in a vehicle capable of automated driving. Specifically, the driving assistance information is information for notifying the driver of a region that is estimated not to be recognized by the driver in the environment around the vehicle.

The driving assistance device 1 controls the output of the driving assistance information on the basis of environmental information on the environment around the vehicle and the machine-learned model (hereinafter, referred to as a "machine learning model") 18. The machine learning model 18 is a learned model in machine learning. Specifically, the machine learning model 18 is a model in which machine learning is performed in advance so as to output control information for performing automated driving control of the vehicle when the environmental information is input. The control information for performing the automated driving control of the vehicle is, for example, information related to a control amount of a steering angle, information related to a control amount of an accelerator, or information related to a control amount of a brake. The control information for performing the automated driving control of the vehicle includes information on various automated driving control amounts necessary for the automated driving control of the vehicle.

The machine learning model 18 includes, for example, a neural network. The machine learning model 18 is generated in advance by reinforcement learning.

In the first embodiment, the environment around the vehicle is an environment surrounding a host vehicle. The environment surrounding the host vehicle refers to a state of the environment surrounding the host vehicle, such as the position of another vehicle or the presence or absence of a pedestrian. In the first embodiment, the state of the host vehicle such as the position of the host vehicle is also included in the state of the environment surrounding the host vehicle.

The environmental information acquiring unit 11 acquires environmental information on the environment around the vehicle.

The environmental information includes, for example, host vehicle information on the host vehicle, exclusive-of-host vehicle information on an exclusive-of-host vehicle, pedestrian information on a pedestrian, road information on a road, or obstacle information on an obstacle.

The host vehicle information includes a vehicle speed of the host vehicle, an acceleration of the host vehicle, a position of the host vehicle, a shape of the host vehicle, information on a traveling lane on which the host vehicle is traveling, or the like.

The exclusive-of-host vehicle information includes a position of an exclusive-of-host vehicle, a vehicle speed of the exclusive-of-host vehicle, a shape of the exclusive-of-host vehicle, information on a traveling lane on which the exclusive-of-host vehicle is traveling, or the like.

The pedestrian information includes information on the position of the pedestrian, the speed at which the pedestrian walks, the shape of the pedestrian, or the like.

The road information includes information related to a lane, a road type, a road shape, a signal, a sign, or a display on a road.

The obstacle information includes information on the position of the obstacle, the moving speed of the obstacle, the shape of the obstacle, or the like.

Note that the above-described environmental information is merely an example, and the environmental information can include any information on the environment surrounding the host vehicle. For example, the environmental information may include information on weather, and the environmental information may include information on traffic congestion.

The environmental information acquiring unit 11 extracts a feature amount from information (hereinafter referred to as "environmental information acquisition information") obtained from an environmental information acquisition device (not illustrated), and generates environmental information. The feature amount is classified corresponding to the type of information included in the environmental information as described above. For example, the environmental information acquiring unit 11 extracts a feature amount corresponding to the position of the exclusive-of-host vehicle and generates environmental information. In the following first embodiment, a feature amount corresponding to each type of information included in the environmental information is also referred to as a "type feature amount".

The environmental information acquisition device is, for example, an imaging device (not illustrated). The imaging device is mounted on a vehicle and captures an image of the front of the vehicle. The environmental information acquiring unit 11 acquires a captured image captured by the imaging device from the imaging device as the environmental information acquisition information. The environmental information acquiring unit 11 extracts a type feature amount from the captured image and generates environmental information.

Specifically, for example, the environmental information acquiring unit 11 extracts a feature amount corresponding to the position of the host vehicle, the speed of the host vehicle, the position of the exclusive-of-host vehicle, the speed of the exclusive-of-host vehicle, the position of a pedestrian, or the like, from the captured image captured by the imaging device. The environmental information acquiring unit 11 generates an image reflecting the extracted feature amount. The image generated by the environmental information acquiring unit 11 is set as environmental information. As described above, the environmental information acquiring unit 11 acquires, for example, environmental information represented with an image.

Figure 2:
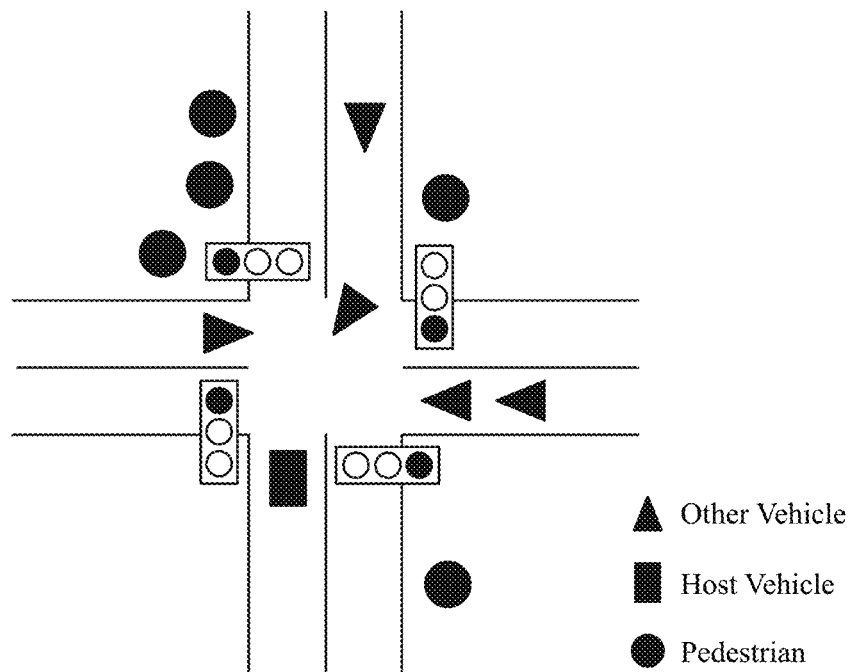
FIG. 2 is a diagram illustrating an example of environmental information represented with an image and acquired by an environmental information acquiring unit in the first embodiment.

Here, FIG. 2 is a diagram illustrating an example of the environmental information represented with an image and acquired by the environmental information acquiring unit 11 in the first embodiment. In FIG. 2, the upper side of the drawing is the traveling direction of the host vehicle.

FIG. 2 illustrates the environmental information in which the environmental information acquiring unit 11 extracts a type feature amount corresponding to an exclusive-of-host vehicle, a type feature amount corresponding to the host vehicle, a type feature amount corresponding to a pedestrian, and a type feature amount indicating a signal, and represents the extracted various types of feature amounts with images. Hereinafter, the image representing the environmental information is also referred to as an "environmental information image".

As illustrated in FIG. 2, the environmental information image is an image obtained by abstracting the environment around the host vehicle. In FIG. 2, the environmental information image is an overhead view.

In the first embodiment, as an example, the environmental information acquiring unit 11 extracts the type feature amount on the basis of the captured image captured by the imaging device and acquires the environmental information image as the environmental information as described above, but this is merely an example.

For example, the environmental information acquisition device may be a distance image sensor (not illustrated). The distance image sensor is mounted on a vehicle and acquires a distance image to an object in front of the vehicle. The environmental information acquiring unit 11 may extract the type feature amount from the distance image to acquire the environmental information.

Furthermore, for example, the environmental information acquisition device may be a radar device (not illustrated). The radar device is mounted on a vehicle and detects an object in front of the vehicle. The environmental information acquiring unit 11 may extract the type feature amount from the information on the detected object to acquire the environmental information.

Furthermore, the environmental information is not limited to an image, and may be, for example, a vector. For example, the environmental information acquiring unit 11 may extract a vector indicating a type feature amount corresponding to the position of the host vehicle, the position of the exclusive-of-host vehicle, or the like on the basis of the captured image captured by the imaging device, and acquire the environmental information on the basis of the information of the vector. As described above, the environmental information acquiring unit 11 may acquire the environmental information as information represented with numerical values.

In the first embodiment, the environmental information acquiring unit 11 acquires the environmental information after extracting the type feature amount on the basis of the environmental information acquisition information obtained from the environmental information acquisition device, but this is merely an example. For example, the environmental information acquiring unit 11 may directly use the environmental information acquisition information obtained from the environmental information acquisition device as the environmental information.

The environmental information acquiring unit 11 outputs the acquired environmental information to the calculation unit 13, the contribution information determining unit 14, and the cognitive information calculating unit 15.

The action information acquiring unit 12 acquires action information on action of the driver.

In the first embodiment, the action of the driver includes the entire action of the driver. The information on the action of the driver includes, for example, information on a line-of-sight direction of the driver, information on a face direction of the driver, the degree of eye opening of the driver, or the degree of concentration of the driver.

The action information acquiring unit 12 acquires action information on the basis of the information obtained from the environmental information acquisition device. In the first embodiment, the action information acquiring unit 12 acquires action information on the basis of a captured image obtained from the imaging device. The action information acquiring unit 12 may acquire action information using, for example, an existing image processing technology.

The action information acquiring unit 12 outputs the acquired action information to the cognitive information calculating unit 15.

The calculation unit 13 obtains control information for performing automated driving control of the vehicle on the basis of the environmental information acquired by the environmental information acquiring unit 11 and the machine learning model 18.

Specifically, the calculation unit 13 inputs the environmental information acquired by the environmental information acquiring unit 11, in other words, the environmental information image to the machine learning model 18 to obtain the control information.

The calculation unit 13 outputs the obtained control information to the contribution information determining unit 14.

Note that the control information obtained by the calculation unit 13 is only required to be used for performing output control of the driving assistance information, and is not required to be used in the automated driving control when the automated driving control of the host vehicle is actually performed.

The contribution information determining unit 14 determines contribution information having a high degree of contribution to the control information on the basis of the environmental information acquired by the environmental information acquiring unit 11 and the control information obtained by the calculation unit 13. Specifically, the contribution information determining unit 14 calculates the degree of contribution of the type feature amount reflected in the environmental information to the control information on the basis of the environmental information acquired by the environmental information acquiring unit 11. Then, the contribution information determining unit 14 determines, as the contribution information, a type feature amount having a high degree of contribution to the control information obtained by the calculation unit 13 among the type feature amounts reflected in the environmental information.

For example, regarding the machine learning model 18, the contribution information determining unit 14 may calculate the degree of contribution using an existing technology for calculating a degree of contribution of the input to the calculation result and determine the contribution information on the basis of the calculated degree of contribution. Furthermore, for example, the contribution information determining unit 14 may generate environmental information (hereinafter, referred to as "environmental information for degree of contribution determination") in which the type feature amount is slightly changed in the environmental information acquired by the environmental information acquiring unit 11, input each of the environmental information and the environmental information for degree of contribution determination to the machine learning model 18, to obtain a calculation result, in other words, control information, and calculate the degree of contribution. The contribution information determining unit 14 generates the environmental information for degree of contribution determination for each type feature amount. The contribution information determining unit 14 compares the control information obtained by using the environmental information as an input with the control information obtained by inputting the environmental information for degree of contribution determination, and in a case where there is a difference equal to or more than a preset value, determines that the type feature amount slightly changed in the environmental information for degree of contribution determination has a large influence on the control information, and sets the degree of contribution of the type feature amount to "high". The contribution information determining unit 14 determines the type feature amount of which the degree of contribution is set to "high" as the contribution information.

For example, when the environmental information is the environmental information image as shown in FIG. 2, the contribution information determining unit 14 calculates the degree of contribution for each of the type feature amounts indicating a plurality of exclusive-of-host vehicles, the type feature amounts indicating the host vehicle, or the type feature amounts indicating a plurality of pedestrians in the environmental information image. Then, the contribution information determining unit 14 determines the type feature amount having a high calculated degree of contribution as contribution information.

It is assumed that it is predetermined how much the degree of contribution is to be determined by the contribution information determining unit 14 that the degree of contribution is high.

The contribution information determined by the contribution information determining unit 14 may be determined by, for example, a binary value in which the type feature amount is "contribution information" or "not contribution information", or may be determined by a numerical value indicating the degree of contribution of the type feature amount to the calculation of the control information.

The contribution information determining unit 14 generates information indicating contribution information (hereinafter, referred to as "information after degree of contribution calculation"). In the first embodiment, the contribution information determining unit 14 matches the information after degree of contribution calculation with a representation format of the environmental information. Here, since the environmental information is generated as an image, the contribution information determining unit 14 represents the information after degree of contribution calculation as an image. The contribution information determining unit 14 generates an image (hereinafter, referred to as a "contribution information image") showing the contribution information with a region on the environmental information image. Specifically, the contribution information determining unit 14 generates, as the contribution information image, an image in which the brightness of a region representing the type feature amount that is the contribution information is made different from the brightness of a region other than the type feature amount that is the contribution information among the type feature amounts in the environmental information image.

Figure 3:
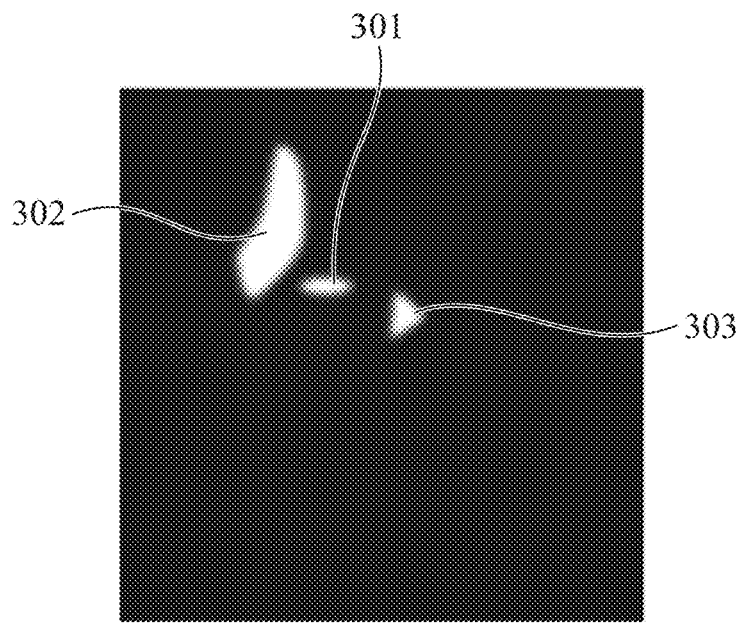
FIG. 3 is a diagram illustrating an example of a contribution information image generated by a contribution information determining unit in the first embodiment.

Here, FIG. 3 is a diagram illustrating an example of the contribution information image generated by the contribution information determining unit 14 in the first embodiment.

When the environmental information is an environmental information image illustrated in FIG. 2, the contribution information image illustrated in FIG. 3 is set as the contribution information image generated by the contribution information determining unit 14 having determined the contribution information on the basis of the environmental information image and the control information obtained by the calculation unit 13.

The contribution information image illustrated in FIG. 3 indicates that the contribution information determining unit 14 has determined, among the type feature amounts in the environmental information image, a type feature amount indicating a signal present in the traveling direction of the host vehicle (see 301 in FIG. 3), a type feature amount indicating a pedestrian present in the traveling direction of the host vehicle (see 302 in FIG. 3), and a type feature amount indicating an oncoming vehicle approaching an intersection (see 303 in FIG. 3) as contribution information having a high degree of contribution to the control information. Note that, the type feature amount indicated by 302 in FIG. 3 includes a type feature amount indicating each of two pedestrians ahead in the traveling direction of the host vehicle and a feature amount indicating one pedestrian on the left side with respect to the traveling direction of the host vehicle.

As illustrated in FIG. 3, in the contribution information image, brightness of a region from which a type feature amount indicating a signal present in the traveling direction of the host vehicle is extracted, a region from which a type feature amount indicating a pedestrian present in the traveling direction of the host vehicle is extracted, and a region from which a type feature amount indicating an oncoming vehicle approaching an intersection is extracted is high, and brightness of regions other than these regions is low. In FIG. 3, the contribution information determining unit 14 sets a region having high brightness to white and a region having low brightness to black.

As described above, when the environmental information acquired by the environmental information acquiring unit 11 is an image, the contribution information determining unit 14 represents, in the image, contribution information having a high degree of contribution to the control information obtained by the calculation unit 13 in a region on the image.

Note that, although in the first embodiment, the contribution information determining unit 14 represents the information after degree of contribution calculation with an image, and the contribution information is represented with a region on the image, this is merely an example. The contribution information determining unit 14 can generate information representing the contribution information in any representation format. However, in a case where the environmental information is represented with the environmental information image, the contribution information determining unit 14 represents the information after degree of contribution calculation with the contribution information image in conformity with the representation format of the environmental information, and the contribution information is represented with a region on the image, so that a difference between the contribution information and the cognitive information can be easily obtained in the driving assistance device 1 as compared with a case where the contribution information is represented with information other than the region on the image. The calculation of the difference between the contribution information and the cognitive information is performed by the specification unit 16. Details of the specification unit 16 will be described later.

The contribution information determining unit 14 outputs the generated contribution information image to the specification unit 16.

On the basis of the environmental information acquired by the environmental information acquiring unit 11 and the action information acquired by the action information acquiring unit 12, the cognitive information calculating unit 15 calculates information (hereinafter referred to as "cognitive information") indicating a cognitive region of the driver in the environment around the host vehicle.

The cognitive information calculating unit 15 generates information (hereinafter, referred to as "information after cognitive determination") indicating the cognitive information.

In the first embodiment, the cognitive information calculating unit 15 matches the information after cognitive determination with the form of the environmental information. Here, since the environmental information is generated as an image, the cognitive information calculating unit 15 represents the information after cognitive determination as an image. The cognitive information calculating unit 15 generates an image (hereinafter referred to as "cognitive information image".) showing the cognitive information with a region on the environmental information image. The cognitive information calculating unit 15 generates the cognitive information image in which the brightness of the region indicating the cognitive information is made different from the brightness of the region other than the region indicating the cognitive information on the environmental information image. For example, in the cognitive information image, the cognitive information calculating unit 15 represents a region indicating the cognitive information in white and a region other than the region indicating the cognitive information in black.

An example of the cognitive information image generated by the cognitive information calculating unit 15 will be described with reference to the drawings.

FIGS. 4 to 6 are diagrams for explaining an example of a cognitive information image generated by the cognitive information calculating unit 15 on the basis of environmental information and action information in the first embodiment. In FIGS. 4 to 6, the upper side of the drawing is the traveling direction of the host vehicle. In addition, in FIGS. 4 to 6, the cognitive information calculating unit 15 also indicates a region indicating the host vehicle together with a region indicating the cognitive information in the cognitive information image. In FIGS. 4 to 6, the region indicating the host vehicle is represented in gray.

Figure 4A:
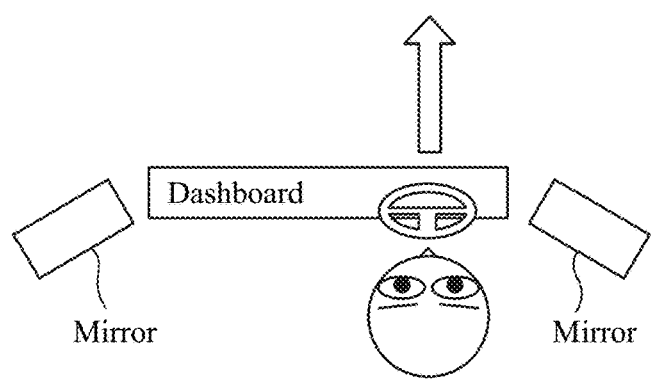
Figure 4B:
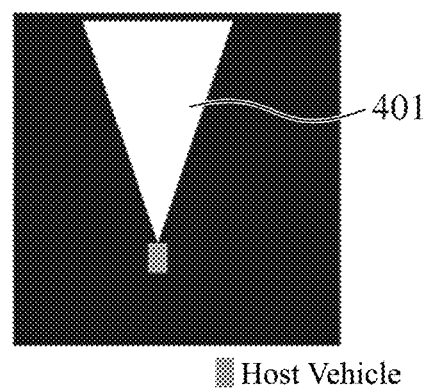

FIG. 4 illustrates an example of the cognitive information image (see FIG. 4B) generated by the cognitive information calculating unit 15 when the driver is facing forward (see FIG. 4A). In FIG. 4B, a region indicating the cognitive information on the cognitive information image is indicated by 401.

The cognitive information calculating unit 15 may determine that the driver faces forward from the line-of-sight direction of the driver included in the action information.

As illustrated in FIG. 4B, the cognitive information image is an image obtained by abstracting the host vehicle and the cognitive information. In FIG. 4B, the cognitive information image is an overhead view.

The cognitive information calculating unit 15 may superimpose the calculated cognitive information in time series to represent the cognitive information. The cognitive information calculating unit 15 may store the cognitive information in a storage unit (not illustrated) each time the cognitive information is calculated, and acquire the time-series cognitive information from the storage unit. In this case, for example, the cognitive information calculating unit 15 may represent the time-series cognitive information with shades of color depending on the degree of driver's recognition (hereinafter, referred to as "degree of recognition").

Figure 5A:
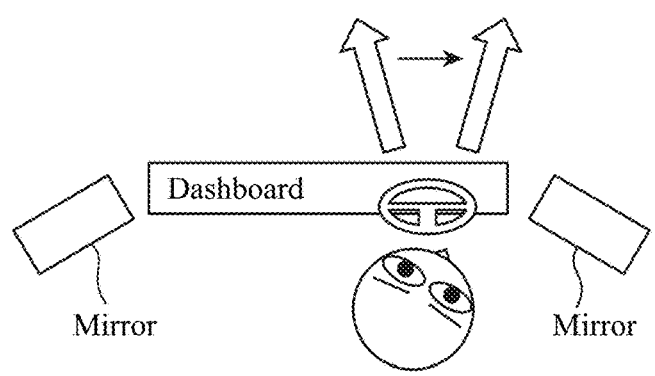
Figure 5B:
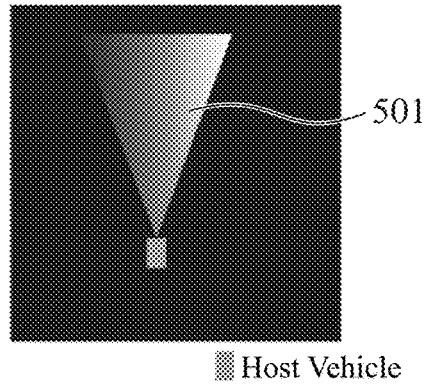

FIG. 5 illustrates an example of the cognitive information image (see FIG. 5B) generated by the cognitive information calculating unit 15 in a case where the driver looks at the left front and then looks at the right front (see FIG. 5A). In FIG. 5B, a region indicating the cognitive information on the cognitive information image is indicated by 501.

In FIG. 5B, the cognitive information calculating unit 15 determines that the degree of recognition of the driver is higher in a region that the driver has viewed more recently, and the degree of recognition of the driver is lower in a region that the driver has viewed more previously. Specifically, in the cognitive information image, the cognitive information calculating unit 15 represents a region indicating the cognitive information when the driver looks at the right front more brightly than a region indicating the cognitive information when the driver looks at the left front.

Furthermore, the cognitive information calculating unit 15 may represent the cognitive information in consideration of a mirror, an imaging device, or the like installed in the host vehicle.

Figure 6A:
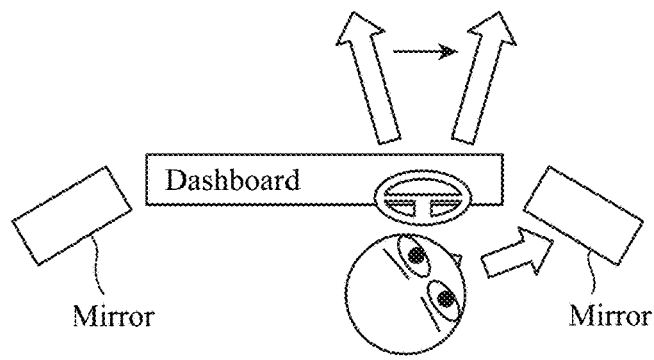
Figure 6B:
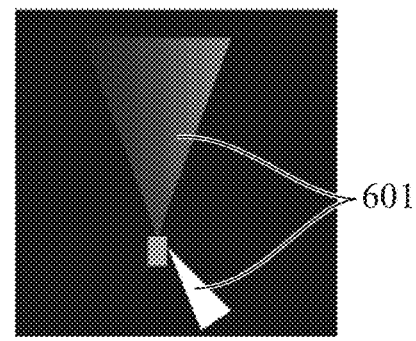

FIG. 6 illustrates an example of the cognitive information image (see FIG. 6B) generated by the cognitive information calculating unit 15 when the driver is in a state of looking at the right side mirror after looking at the left front and then looking at the right front (see FIG. 6A). In FIG. 6B, a region indicating the cognitive information on the cognitive information image is indicated by 601.

In FIG. 6B, in addition to the region indicating the cognitive information when the driver looks at the left front and the region indicating the cognitive information when the driver looks at the right front, the cognitive information calculating unit 15 represents the region indicating the cognitive information when the driver looks at the right side mirror more brightly on the cognitive information image. Note that the cognitive information calculating unit 15 may determine that the driver has looked at the right side mirror on the basis of the line-of-sight direction of the driver and the information on the installation position of the right side mirror included in the environmental information. The information on the installation position of the right side mirror is included in the environmental information as host vehicle information, for example. When the driver looks at the right side mirror, the cognitive information calculating unit 15 calculates a right rear region of the host vehicle with respect to the traveling direction as the cognitive information.

The cognitive information calculating unit 15 increases the brightness of the region in the order of the region indicating the cognitive information when the driver looks at the left front, the region indicating the cognitive information when the driver looks at the right front, and the region indicating the cognitive information when the driver looks at the right side mirror.

The cognitive information calculating unit 15 outputs the generated information after cognitive determination to the specification unit 16. Here, the cognitive information calculating unit 15 outputs the generated cognitive information image to the specification unit 16.

Note that, although in the first embodiment, the cognitive information calculating unit 15 represents the information after cognitive determination with an image, and the cognitive information is represented with a region on the image, this is merely an example. The cognitive information calculating unit 15 can generate information in which the cognitive information is represented in any representation format. However, in a case where the environmental information and the contribution information are represented with an image, the cognitive information calculating unit 15 represents the information after cognitive determination with the cognitive information image together with the environmental information and the contribution information, and the cognitive information is represented with a region on the image, so that a difference between the contribution information and the cognitive information can be easily obtained in the driving assistance device 1 as compared with a case where the cognitive information is represented with information other than the region on the image. The calculation of the difference between the contribution information and the cognitive information is performed by the specification unit 16. Details of the specification unit 16 will be described later.

On the basis of the contribution information determined by the contribution information determining unit 14 and the cognitive information calculated by the cognitive information calculating unit 15, the specification unit 16 specifies contribution information (hereinafter, referred to as "unrecognized contribution information") estimated not to be recognized by the driver.

The specification unit 16 compares the contribution information with the cognitive information, and specifies the unrecognized contribution information.

In the first embodiment, the specification unit 16 specifies the unrecognized contribution information by a difference or excess or deficiency caused as a result of comparing the contribution information image generated by the contribution information determining unit 14 with the cognitive information image generated by the cognitive information calculating unit 15. Specifically, for example, the specification unit 16 compares the contribution information image with the cognitive information image, and extracts, as a difference, contribution information represented with a region not overlapping with a region representing the cognitive information on the cognitive information image in the contribution information image. The specification unit 16 specifies the contribution information extracted as the difference as the unrecognized contribution information.

Figure 7:
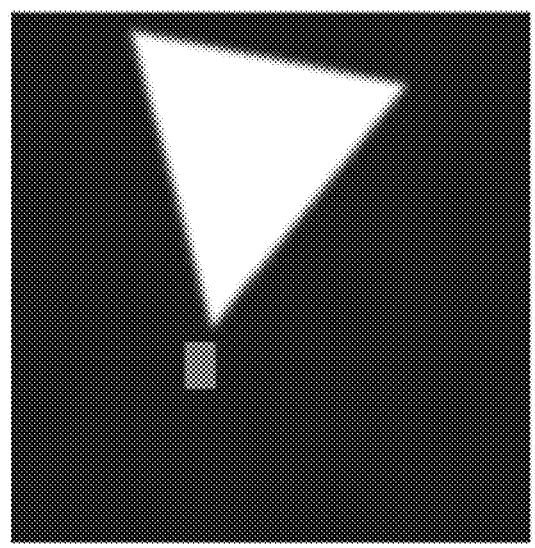
FIG. 7 is a diagram for explaining an image of another example of the cognitive information image generated by the environmental information acquiring unit on the basis of the environmental information and the action information in the first embodiment.

A series of processing in which the specification unit 16 specifies the unrecognized contribution information will be described with reference to the drawings with a specific example. In the following specific example, it is assumed that the contribution information image is an image as illustrated in FIG. 3. In addition, it is assumed that the cognitive information image is an image as illustrated in FIG. 7. In FIG. 7, the upper side of the drawing is the traveling direction of the host vehicle. Note that the cognitive information image illustrated in FIG. 7 indicates that the cognitive region of the driver is a region slightly diagonally forward to the right of the driver. That is, the cognitive information image illustrated in FIG. 7 indicates that the driver recognizes a region slightly diagonally forward to the right with respect to the traveling direction.

The specification unit 16 compares the cognitive information image illustrated in FIG. 7 with the contribution information image illustrated in FIG. 3, and specifies a region that is estimated not to be recognized by the driver.

Here, in the region indicating the contribution information on the contribution information image illustrated in FIG. 3, the region indicating the pedestrian on the left side with respect to the traveling direction of the host vehicle does not overlap the region indicating the cognitive information on the cognitive information image illustrated in FIG. 7. Therefore, the specification unit 16 specifies the contribution information indicating the pedestrian on the left side with respect to the traveling direction of the host vehicle in the contribution information image as the unrecognized contribution information.

The specification unit 16 outputs the specified unrecognized contribution information to the information output control unit 17.

The information output control unit 17 outputs driving assistance information necessary for driving assistance on the basis of the unrecognized contribution information specified by the specification unit 16.

In the first embodiment, for example, the information output control unit 17 outputs the driving assistance information in an image format.

Figure 8:
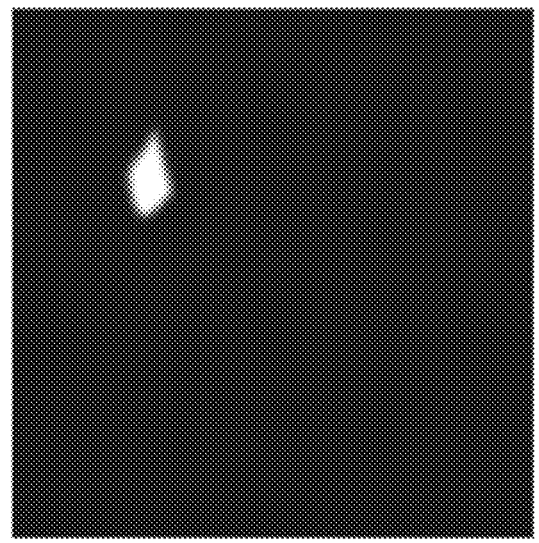
FIG. 8 is a diagram for explaining an example of driving assistance information output in an image format by an information output control unit in the first embodiment.

FIG. 8 is a diagram for explaining an example of driving assistance information output by the information output control unit 17 in an image format in the first embodiment.

FIG. 8 illustrates the driving assistance information as an image output by the information output control unit 17 when the contribution information image is an image as illustrated in FIG. 3, the cognitive information image is an image as illustrated in FIG. 7, and the specification unit 16 specifies the contribution information indicating the pedestrian on the left side with respect to the traveling direction of the host vehicle as the unrecognized contribution information.

In the image illustrated in FIG. 8, a region indicating a pedestrian on the left side with respect to the traveling direction of the host vehicle is represented with brightness different from brightness of a region other than the region.

The driving assistance information output by the information output control unit 17 is used, for example, in an application that outputs an alarm to a driver who is driving a vehicle. Specifically, for example, the information output control unit 17 outputs an alarm for notifying the driver that the driver has failed to recognize necessary information from an output device (not illustrated) mounted on the traveling host vehicle. In the above example, the information output control unit 17 outputs a message notifying the driver of the host vehicle that the pedestrian on the left side with respect to the traveling direction is not recognized.

Furthermore, for example, the driving assistance information output by the information output control unit 17 can be also used in an application for forcibly shifting from driving by the driver to automated driving. Specifically, for example, the information output control unit 17 outputs driving assistance information to an automated driving control unit (not illustrated) that is mounted on the traveling host vehicle and controls automated driving. When the driving assistance information is driving assistance information indicating a predetermined type, the automated driving control unit forcibly shifts driving of the host vehicle to automated driving.

As described above, the machine learning model 18 is a learned model in the machine learning in which the machine learning is performed in advance so as to output the control information for performing the automated driving control of the vehicle when the environmental information is input.

In FIG. 1, the machine learning model 18 is provided in the driving assistance device 1, but this is merely an example. The machine learning model 18 may be provided at a place where the driving assistance device 1 can refer to outside the driving assistance device 1.

The operation of the driving assistance device 1 according to the first embodiment will be described.

FIG. 9 is a flowchart for explaining the operation of the driving assistance device 1 according to the first embodiment.

The environmental information acquiring unit 11 acquires environmental information on the environment around the vehicle (step ST901).

Specifically, the environmental information acquiring unit 11 extracts the type feature amount on the basis of the captured image captured by the imaging device to acquire the environmental information represented with the image.

The environmental information acquiring unit 11 outputs the acquired environmental information to the calculation unit 13, the contribution information determining unit 14, and the cognitive information calculating unit 15.

The action information acquiring unit 12 acquires action information on action of the driver (step ST902).

Specifically, the action information acquiring unit 12 acquires action information on the basis of a captured image obtained from the imaging device.

The action information acquiring unit 12 outputs the acquired action information to the cognitive information calculating unit 15.

The calculation unit 13 obtains control information for performing automated driving control of the vehicle on the basis of the environmental information acquired by the environmental information acquiring unit 11 in step ST901 and the machine learning model 18 (step ST903).

Specifically, the calculation unit 13 inputs the environmental information acquired by the environmental information acquiring unit 11 to the machine learning model 18 to obtain the control information.

The calculation unit 13 outputs the obtained control information to the contribution information determining unit 14.

The contribution information determining unit 14 determines contribution information having a high degree of contribution to the control information on the basis of the environmental information acquired by the environmental information acquiring unit 11 in step ST901 and the control information obtained by the calculation unit 13 in step ST903 (step ST904). Specifically, the contribution information determining unit 14 calculates the degree of contribution of the type feature amount reflected in the environmental information to the control information on the basis of the environmental information acquired by the environmental information acquiring unit 11. Then, the contribution information determining unit 14 determines, as the contribution information, a type feature amount having a high degree of contribution to the control information obtained by the calculation unit 13 among the type feature amounts reflected in the environmental information.

The contribution information determining unit 14 generates a contribution information image showing the contribution information with a region on the environmental information image. Specifically, the contribution information determining unit 14 generates, as the contribution information image, an image in which the brightness of a region representing the type feature amount that is the contribution information is made different from the brightness of a region other than the type feature amount that is the contribution information among the type feature amounts in the environmental information image.

The contribution information determining unit 14 outputs the generated contribution information image to the specification unit 16.

On the basis of the environmental information acquired by the environmental information acquiring unit 11 in step ST901 and the action information acquired by the action information acquiring unit 12 in step ST902, the cognitive information calculating unit 15 calculates the cognitive information indicating the cognitive region of the driver in the environment around the host vehicle (step ST905).

The cognitive information calculating unit 15 generates a cognitive information image showing the cognitive information with a region on the environmental information image.

The cognitive information calculating unit 15 outputs the generated cognitive information image to the specification unit 16.

The specification unit 16 specifies unrecognized contribution information on the basis of the contribution information determined by the contribution information determining unit 14 in step ST904 and the cognitive information calculated by the cognitive information calculating unit 15 in step ST905 (step ST906).

The specification unit 16 outputs the specified unrecognized contribution information to the information output control unit 17.

The information output control unit 17 outputs driving assistance information necessary for driving assistance on the basis of the unrecognized contribution information specified by the specification unit 16 in step ST906 (step ST907).

Note that, here, the operation of step ST902 is performed after the operation of step ST901 and before the operation of step ST903, but this is merely an example. It suffices that the operation of step ST902 is performed after the operation of step ST 901 and before the operation of step ST 905 is performed.

As described above, the driving assistance device 1 obtains the control information by inputting the environmental information on the environment around the vehicle to the machine learning model 18 that uses the environmental information as an input and outputs the control information for performing the automated driving control of the vehicle. The driving assistance device 1 determines contribution information having a high degree of contribution to the obtained control information among the environmental information on the environment around the vehicle, and specifies the unrecognized contribution information on the basis of the contribution information and the cognitive information indicating the cognitive region of the driver in the environment around the vehicle. Then, the driving assistance device 1 outputs the driving assistance information on the basis of the specified unrecognized contribution information.

Since the driving assistance device 1 uses the machine learning model 18 when specifying the driving assistance information as described above, it is possible to output information for driving assistance corresponding to the infinite number of environments.

In the first embodiment described above, when determining the contribution information, the contribution information determining unit 14 may perform weighting on the calculated degree of contribution and then determine information having the high degree of contribution as the contribution information.

For example, in a case where the calculation of the control information is performed using the machine learning model 18 that uses the environmental information as an input and outputs the control amount of the steering angle, the control amount of the accelerator, and the control amount of the brake, there is a possibility that the type feature amount having a high degree of contribution to the control information is limited to the type feature amount indicating the topography such as the road or the white line. In this case, the contribution information determining unit 14 determines the type feature amount indicating the topography as the contribution information. The driving assistance device 1 according to the first embodiment determines whether or not the driver recognizes the region to be recognized, and when the driver does not recognize the region to be recognized, uses the contribution information to notify the driver of the region that is not recognized. Therefore, in the driving assistance device 1, it is necessary to determine the type feature amount indicating the information on the road environment with the passerby or another vehicle as the contribution information in preference to the topographical information. Since the contribution information determining unit 14 performs weighting on the degree of contribution and then determines the type feature amount having a high degree of contribution as the contribution information, it is possible to prevent the type feature amount indicating the topography from being determined as the contribution information in preference to the type feature amount indicating the information on the road environment as described above. As a result, the driving assistance device 1 can appropriately determine whether or not the driver recognizes the region to be recognized.

In the first embodiment described above, the machine learning model 18 is generated by reinforcement learning. However, the learning method for generating the machine learning model 18 is not limited to reinforcement learning. For example, the machine learning model 18 may be generated by performing supervised learning using the supervised environmental information as teacher data. However, when the machine learning model 18 is generated by reinforcement learning, it is possible to learn using a simulator, for example, even in an environment where teacher data cannot be sufficiently collected.

Furthermore, in the first embodiment described above, it is assumed that there is one machine learning model 18, but this is merely an example.

For example, there may be a plurality of machine learning models 18 different corresponding to the environmental information. Specific examples of the machine learning model 18 corresponding to the environmental information include a machine learning model 18 corresponding to a right turn scene, a machine learning model 18 corresponding to a left turn scene, a machine learning model 18 corresponding to a scene of traveling on a general road, and a machine learning model 18 corresponding to a scene of traveling on a highway.

In a case where there are a plurality of machine learning models 18, the calculation unit 13 can obtain the control information using different machine learning models 18 corresponding to the environmental information acquired by the environmental information acquiring unit 11. For example, when the host vehicle turns right, the calculation unit 13 can obtain the control information using the machine learning model 18 corresponding to the right turn scene. The calculation unit 13 may determine that the host vehicle will turn right from the host vehicle information, the road information, and the like included in the environmental information.

As described above, the calculation unit 13 obtains the control information using the machine learning models 18 different corresponding to the environmental information, so that the driving assistance device 1 can determine the contribution information corresponding to the environment around the vehicle more than a case where there is only one machine learning model 18, and as a result, it is possible to more appropriately determine whether or not the driver recognizes the region to be recognized.

In the first embodiment described above, the cognitive information calculating unit 15 calculates the cognitive information on the basis of the environmental information and the action information, but the cognitive information calculating unit 15 does not require the environmental information when calculating the cognitive information. The cognitive information calculating unit 15 may calculate the cognitive information on the basis of only the action information.

However, in this case, when the specification unit 16 calculates the difference between the contribution information and the cognitive information, the specification unit 16 needs to generate the cognitive information image representing the cognitive information on the environmental information image in consideration of the environmental information similarly to the contribution information image so that the contribution information overlapping with the cognitive information is not determined as the contribution information not overlapping with the cognitive information. That is, for example, when the same information is indicated by a region on the image in each of the contribution information image and the cognitive information image, the specification unit 16 needs to generate the cognitive information image in which the region on the contribution information image matches the region on the cognitive information image. The specification unit 16 compares the generated cognitive information image with the contribution information image.

In the first embodiment described above, the driving assistance device 1 is mounted on a vehicle, but this is merely an example.

For example, a part of the components of the driving assistance device 1 as described with reference to FIG. 1 may be provided in a server. For example, the environmental information acquiring unit 11 and the action information acquiring unit 12 may be mounted on a vehicle, and the functions of the calculation unit 13, the contribution information determining unit 14, the cognitive information calculating unit 15, the specification unit 16, and the information output control unit 17 may be provided in a server.

In the first embodiment described above, a target to which the driving assistance device 1 outputs the driving assistance information is a vehicle, but this is merely an example.

For example, a target to which the driving assistance device 1 outputs driving assistance information may be a forklift (not illustrated) capable of automatically conveying an object in a factory.

Furthermore, for example, the target to which the driving assistance device 1 outputs the driving assistance information may be a driving simulator (not illustrated) that is used for teaching the driving or traveling of the vehicle and simulates driving or traveling of the vehicle.

A target to which the driving assistance device 1 outputs the driving assistance information can be any mobile object capable of automated driving.

Figure 10A:
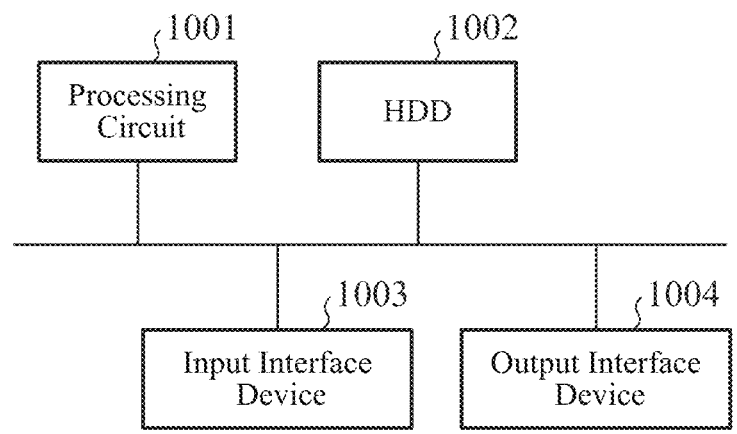
FIGS. 10A and 10B are diagrams showing an example of a hardware configuration of the driving assistance device according to the first embodiment.
Figure 10B:
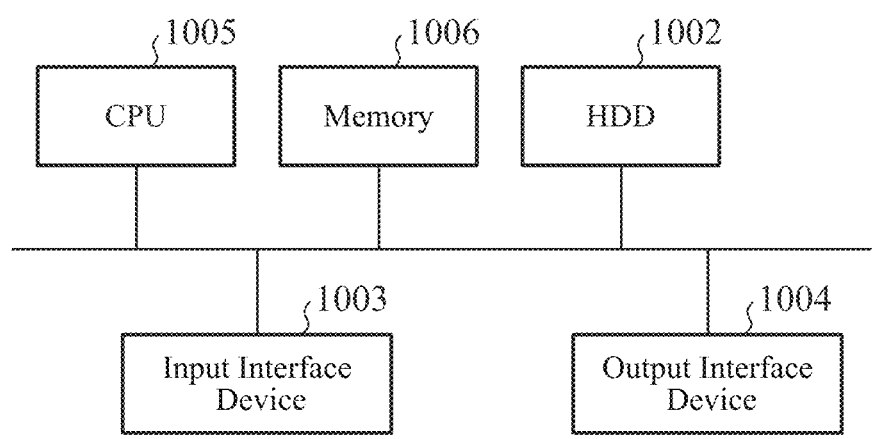

FIGS. 10A and 10B are diagrams showing an example of a hardware configuration of the driving assistance device 1 according to the first embodiment.

In the first embodiment, the functions of the environmental information acquiring unit 11, the action information acquiring unit 12, the calculation unit 13, the contribution information determining unit 14, the cognitive information calculating unit 15, the specification unit 16, and the information output control unit 17 are implemented by a processing circuit 1001. That is, the driving assistance device 1 includes the processing circuit 1001 for performing control for specifying the driving assistance information on the basis of the contribution information determined on the basis of the control information obtained using the machine learning model 18 and the cognitive information indicating the cognitive region of the driver.

The processing circuit 1001 may be dedicated hardware as shown in FIG. 10A, or may be a central processing unit (CPU) 1005 which executes a program stored in a memory 1006 as shown in FIG. 10B.

In a case where the processing circuit 1001 is dedicated hardware, the processing circuit 1001 may be, for example, a single circuit, a composite circuit, a programmed processor, a parallel-programmed processor, an application specific integrated circuit (ASIC), a field-programmable gate array (FPGA), or a combination thereof.

When the processing circuit 1001 is the CPU 1005, the functions of the environmental information acquiring unit 11, the action information acquiring unit 12, the calculation unit 13, the contribution information determining unit 14, the cognitive information calculating unit 15, the specification unit 16, and the information output control unit 17 are implemented by software, firmware, or a combination of software and firmware. That is, the environmental information acquiring unit 11, the action information acquiring unit 12, the calculation unit 13, the contribution information determining unit 14, the cognitive information calculating unit 15, the specification unit 16, and the information output control unit 17 are implemented by the CPU 1005 that executes programs stored in a hard disk drive (HDD) 1002, the memory 1006, or the like, or the processing circuit 1001 such as a system large-scale integration (LSI). It can also be said that the programs stored in the HDD 1002, the memory 1006, and the like cause a computer to execute the procedures or methods performed by the environmental information acquiring unit 11, the action information acquiring unit 12, the calculation unit 13, the contribution information determining unit 14, the cognitive information calculating unit 15, the specification unit 16, and the information output control unit 17. Here, the memory 1006 is, for example, a nonvolatile or volatile semiconductor memory, such as a RAM (Random Access Memory), a ROM (Read Only Memory), a flash memory, an EPROM (Erasable Programmable Read Only Memory), and an EEPROM (Electrically Erasable Programmable Read Only Memory), a magnetic disk, a flexible disk, an optical disk, a compact disk, a mini disk, a DVD (Digital Versatile Disc), or the like.

Note that a part of the functions of the environmental information acquiring unit 11, the action information acquiring unit 12, the calculation unit 13, the contribution information determining unit 14, the cognitive information calculating unit 15, the specification unit 16, and the information output control unit 17 may be implemented by dedicated hardware, and a part thereof may be implemented by software or firmware. For example, the functions of the environmental information acquiring unit 11 and the action information acquiring unit 12 can be implemented by the processing circuit 1001 as dedicated hardware, and the functions of the calculation unit 13, the contribution information determining unit 14, the cognitive information calculating unit 15, the specification unit 16, and the information output control unit 17 can be implemented by the processing circuit 1001 reading and executing programs stored in the memory 1006.

In addition, the driving assistance device 1 includes an input interface device 1003 and an output interface device 1004 that perform wired communication or wireless communication with a device such as an environmental information acquisition device, an output device, or an automated driving control unit, which are not illustrated.

As described above, according to the first embodiment, the driving assistance device 1 includes the environmental information acquiring unit 11 to acquire environmental information on an environment around a mobile object, the action information acquiring unit 12 to acquire action information on an action of a driver of the mobile object, the calculation unit 13 to obtain control information for performing automated driving control of the mobile object on the basis of the environmental information acquired by the environmental information acquiring unit 11 and the machine learning model 18 that uses the environmental information as an input and outputs the control information, the contribution information determining unit 14 to determine contribution information having a high degree of contribution to the control information on the basis of the environmental information acquired by the environmental information acquiring unit 11 and the control information obtained by the calculation unit 13, the cognitive information calculating unit 15 to calculate cognitive information indicating a cognitive region of the driver in the environment around the mobile object on the basis of the action information acquired by the action information acquiring unit 12 and the environmental information acquired by the environmental information acquiring unit 11, the specification unit 16 to specify unrecognized contribution information estimated not to be recognized by the driver on the basis of the contribution information determined by the contribution information determining unit 14 and the cognitive information calculated by the cognitive information calculating unit 15, and the information output control unit 17 to output driving assistance information necessary for driving assistance on the basis of the unrecognized contribution information specified by the specification unit 16. Therefore, the driving assistance device 1 can output information for driving assistance corresponding to the infinite number of environments.

Further, according to the first embodiment, in the driving assistance device 1, the contribution information determining unit 14 performs weighting on the degree of contribution and then calculates the contribution information. Therefore, the driving assistance device 1 can determine the type feature amount to be preferentially set as the contribution information as the contribution information, and can appropriately determine whether or not the driver recognizes the region to be recognized.

Further, according to the first embodiment, when there is a plurality of machine learning models 18, in the driving assistance device 1, the calculation unit 13 is configured to obtain the control information using different machine learning models 18 corresponding to the environmental information acquired by the environmental information acquiring unit 11. Therefore, the driving assistance device 1 can determine the contribution information corresponding to the environment around the vehicle more than a case where there is only one machine learning model 18, and as a result, it is possible to more appropriately determine whether or not the driver recognizes the region to be recognized.

It should be noted that the invention of the present application is capable of modifying any of the constituent elements of the embodiment or omitting any of the constituent elements of the embodiment within the scope of the invention.

INDUSTRIAL APPLICABILITY

Since the vehicle control calculation device according to the present invention is configured to be able to output information for driving assistance corresponding to the infinite number of environments, the vehicle control calculation device can be applied to a driving assistance device that outputs information for assisting driving by a driver of a mobile object.

REFERENCE SIGNS LIST

1: driving assistance device, 11: environmental information acquiring unit, 12: action information acquiring unit, 13: calculation unit, 14: contribution information determining unit, 15: cognitive information calculating unit, 16: specification unit, 17: information output control unit, 18: machine learning model, 1001: processing circuit, 1002: HDD, 1003: input interface device, 1004: output interface device, 1005: CPU, 1006: memory

The invention claimed is:

1. A driving assistance device comprising:
processing circuitry configured to
acquire environmental information on an environment around a mobile object;
acquire action information on an action of a driver of the mobile object;
obtain control information for performing automated driving control of the mobile object on a basis of the acquired environmental information and a machine learning model that uses the environmental information as an input and outputs the control information;
determine contribution information having a high degree of contribution to the control information on a basis of the acquired environmental information and the obtained control information;
calculate cognitive information indicating a cognitive region of the driver in the environment around the mobile object on a basis of the acquired action information and the acquired environmental information;
specify unrecognized contribution information estimated not to be recognized by the driver on a basis of the determined contribution information and the calculated cognitive information; and
output driving assistance information necessary for driving assistance on a basis of the unrecognized contribution information that has been specified.

2. The driving assistance device according to claim 1, wherein the machine learning model is a model generated by reinforcement learning.

3. The driving assistance device according to claim 1, wherein when the acquired environmental information is an image, the processing circuitry represents, in the image, the contribution information having the high degree of contribution to the obtained control information in a region on the image.

4. The driving assistance device according to claim 1, wherein the processing circuitry calculates the contribution information after performing weighting on the degree of contribution.

5. The driving assistance device according to claim 1, wherein the machine learning model includes a plurality of machine learning models, and
processing circuitry obtains the control information by using a corresponding model from the plurality of machine learning models, depending on the acquired environmental information.

6. A driving assist method comprising:
acquiring environmental information on an environment around a mobile object;
acquiring action information on an action of a driver of the mobile object;
obtaining control information for performing automated driving control of the mobile object on a basis of the acquired environmental information and a machine learning model that uses the environmental information as an input and outputs the control information;
determining contribution information having a high degree of contribution to the control information on a basis of the acquired environmental information and the obtained control information;
calculating cognitive information indicating a cognitive region of the driver in the environment around the mobile object on a basis of the acquired action information and the acquired environmental information;
specifying unrecognized contribution information estimated not to be recognized by the driver on a basis of the determined contribution information and the calculated cognitive information; and
outputting driving assistance information necessary for driving assistance on a basis of the unrecognized contribution information that has been specified.

* * * * *